(12) United States Patent
Jensen et al.

(10) Patent No.: US 6,701,857 B1
(45) Date of Patent: Mar. 9, 2004

(54) DEPTH CONTROL DEVICE FOR PLANTING IMPLEMENT

(76) Inventors: Lynn David Jensen, 20318 444th Ave., Lake Preston, SD (US) 57249; Chris Nelson, 8220 Stevens Ave. South, Bloomington, MN (US) 55420; James P LeClaire, 1256 Eleanor Ave., St. Paul, MN (US) 55116

( * ) Notice: Subject to any disclaimer, the term of this patent is extended or adjusted under 35 U.S.C. 154(b) by 0 days.

(21) Appl. No.: 10/345,346

(22) Filed: Jan. 16, 2003

(51) Int. Cl.[7] ............................................... A01C 15/00
(52) U.S. Cl. ........................ 111/200; 111/900; 701/50; 172/4
(58) Field of Search ................................ 111/200, 963, 111/900, 135; 701/50, 200, 903, 900, 135; 172/4, 2, 413

(56) References Cited

U.S. PATENT DOCUMENTS

| | | |
|---|---|---|
| 3,749,035 A | 7/1973 | Cayton et al. |
| 4,176,721 A | 12/1979 | Poggemiller et al. .......... 172/4 |
| 4,353,423 A | 10/1982 | Poggemiller et al. .... 172/260.5 |
| 4,413,685 A | 11/1983 | Gremelspacher et al. ... 172/316 |
| 4,913,070 A | 4/1990 | Morrison, Jr. .............. 111/135 |
| 5,562,165 A | 10/1996 | Janelle et al. ................... 172/4 |
| 6,164,385 A * | 12/2000 | Buchl .......................... 172/239 |
| 6,263,977 B1 * | 7/2001 | Mayerle et al. .............. 172/311 |
| 6,302,220 B1 * | 10/2001 | Mayerle et al. .............. 172/459 |
| 6,378,619 B2 * | 4/2002 | Mayerle et al. ................ 172/2 |
| 6,460,623 B1 * | 10/2002 | Knussman et al. ............ 172/4 |
| 6,640,468 B2 * | 11/2003 | Menze ......................... 37/234 |
| 2001/0045294 A1 * | 11/2001 | Mayerle et al. .............. 172/452 |

* cited by examiner

*Primary Examiner*—Christopher J. Novosad
(74) *Attorney, Agent, or Firm*—Peter A. Bursari

(57) ABSTRACT

A method and apparatus for automatically adjusting the down pressure exerted by an actuating device on a seed channel opener of a planting implement in order to maintain the seed channel opener at a predetermined depth. The method and apparatus includes a depth control device which senses the load on the depth control wheel of the planting implement and transmits a sensed load output to an electronic control unit. The electronic control unit includes a micro-controller which receives, monitors and analyzes the sensed load output and compares it to the predetermined depth value. When the micro-controller detects a change between the predetermined depth value and sensed output value, a signal is transmitted to a regulating control valve which adjusts the down pressure exerted by the actuating device on the seed channel opener to maintain the proper cutting depth.

23 Claims, 6 Drawing Sheets

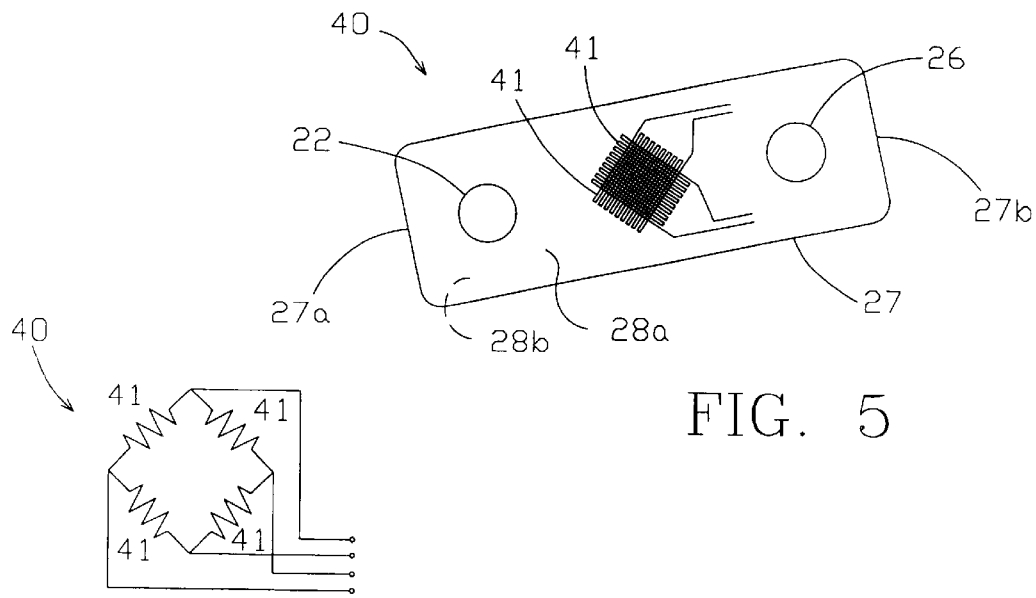
FIG. 5
FIG. 4
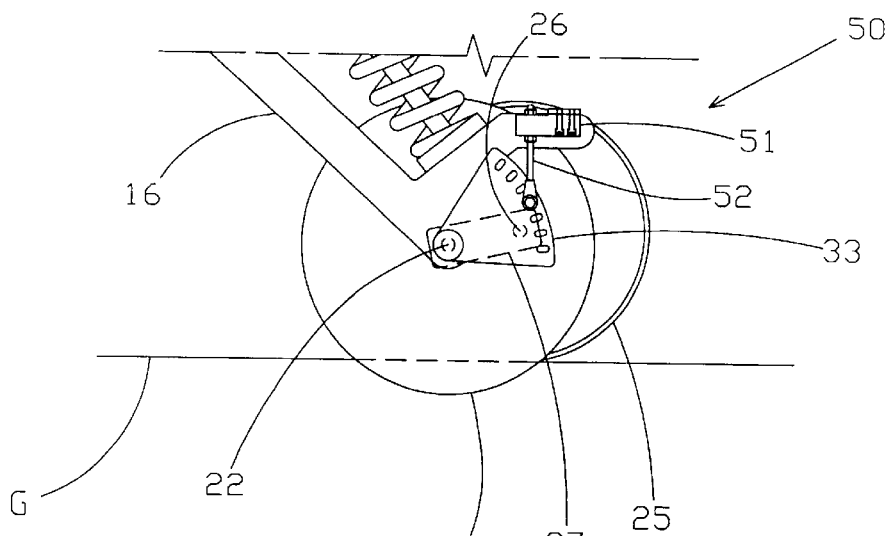
FIG. 6

DEPTH CONTROL DEVICE FOR PLANTING IMPLEMENT

FIELD OF INVENTION

The present invention relates to a planting implement, such as a corn planter or the like, having a seed channel opener connected to a depth control wheel and having a depth control device which electronically controls and automatically adjusts the down pressure load to ensure that a seed channel is cut to a proper depth. More particularly, the depth control device of the present invention provides electronic control means in the form of an instrumented arm for measuring the load on the depth control wheel of a planting implement and automatically adjusting the down pressure to ensure that the seed channel opener is at the proper cutting depth.

BACKGROUND OF THE INVENTION

Devices and techniques to improve farming conditions are nearly as old as farming itself. One condition with which farmers must contend is soil variances in the field to be planted, particularly variances in soil wetness. Before no-till planting came into fashion, a farmer typically would till the whole field. The tilling operation would result in "uniform" field conditions (other than specific wet areas). By "uniform" field conditions, it is meant that the required down pressure produced by a planting implement to open or cut a furrow and accurately place the seed remained constant or "uniform". More recently, no-till farming was introduced to improve soil moisture management and conservation measures. No-till planting involves planting the seeds into untilled ground. Because the ground is untilled, the field has greater variances in soil conditions. In other words, the untilled field has non-uniform field conditions.

Conventional planting implements currently used in no-till farming, commonly referred to as "planters" utilize a seed channel opener, typically in the form of a disc, that creates a channel or furrow in the soil for seed placement. These conventional planters do not provide adequate means for automatic adjustment to account for variances in soil conditions. Rather, such equipment requires the farmer to make manual adjustment as changes in soil conditions, such as wetness and firmness, are observed during the planting process. This adjustment usually is made by manually changing the down pressure hydraulic controls to multiple planter units, which in turn adjusts the down pressure exerted on the seed channel opener. Because the soil conditions can change often, manual adjustment tends to be an ineffective process, as the farmer may not adjust the down pressure sufficiently or frequently enough.

The consequences of ineffective manual adjustment can be categorized into four types of negative results. First, under moist soil conditions, the seed bed can become compacted by excessive down pressure. Second, under hard, dry and/or compacted soil conditions, insufficient down pressure can result in a seed channel of inadequate depth or a seed channel simply not formed, resulting in seed placement on the soil surface. Third, in soft soil conditions, the seed channel can be cut too deeply by excessive down pressure, resulting in seed placement which is too deep. And four, the constant manual adjustment causes unnecessary equipment wear.

In order to better understand how these negative consequences result from ineffective manual adjustment, consider the farmer who initially sets the down pressure of the planting implement to accommodate the average soil conditions in his field. When hard soil conditions are encountered, the down pressure exerted on the seed opener is not sufficient to create the seed channel. Thus, the seed is placed on top of the ground, thereby lowering crop yields. When wet or soft soil conditions are encountered, the down pressure exerted on the seed opener is excessive. In wetter soil, this excessive pressure will cause compacting on either side of the seed channel and can cause accumulation and pushing of mud. In softer soil, this excessive pressure can cause the seed channel to be cut too deep. These conditions also lower the crop yields. Finally, the excessive down pressure in both wet soil and soft soil conditions is an unnecessary burden to both the tractor pulling the planter and the depth control wheel bearing of the planter.

Attempts have been made in the prior art to improve planting equipment particularly used in no-till farming. U.S. Pat. No. 4,176,721 to Poggemiller et al., issued Dec. 4, 1979, discloses a depth control device which is attached to an agricultural implement to control, within pre-determined limits, the depth of penetration of the ground working implement (GWI). The depth control device includes two separate sensing means, a first ground engaging sensing member and second, a sensor connected to the GWI. Both sensors are mechanically connected to switches which operate to raise and lower the mechanism for the ground working implements. The depth control device operates between a preset distance between the GWI and the frame and a preset depth such that when variance in the ground is encountered, the ground working implement itself is raised or lowered relative to the planter frame. In addition to the use of the separate ground engaging sensing member, an inherent drawback to Poggemiller et al. is the use of preset limits, particularly the preset distance between the GWI and the frame in order to raise or lower the ground working implement.

In U.S. Pat. No. 3,749,035 to Cayton et al., issued Jul. 31, 1973, a precision depth seed planter is disclosed. The planter comprises a series of ground working units mounted on a main frame with each unit having a pair of depth gauge wheels for carrying the unit and for regulating the depth of the seed channel. A ground-engaging sensing unit is mounted on the main frame and comprises two shoes, one which rides on the ground surface and the other which penetrates the surface. Based on the relative distance between the two shoes, the soil hardness is "determined" and mechanically adjusts the hydraulic pressure between the ground working units and the main frame in order to maintain a uniform planting depth. A significant disadvantage to the Cayton et al. planter is the complexity of the separate mechanical sensing arrangement. Moreover, it appears that the hydraulic pressure must be set at an initial starting point and then it is expected that a change in the hydraulic pressure based on the relative distance between the two shoes will properly adjust the ground working unit to the correct down force. However, there is no feedback from the ground working unit that it is operating in the proper position.

U.S. Pat. No. 4,353,423 to Poggemiller et al., issued Oct. 12, 1982, provides a hydraulic reset for a planter comprising a resetting ram assembly extending between the ground working implement and the main frame. The resetting ram functions as a reset, such that if the GWI encounters an obstruction, the resetting ram enables the GWI to rotate and travel over the obstruction. The hydraulic reset utilizes two preset hydraulic pressures; the first pressure is the pressure set in the main hydraulic system to engage the GWI's with the ground and the second pressure is set in the resetting ram, this second pressure being set at a value to allow the GWI to absorb an obstruction. Although this hydraulic reset device does overcome problems associated with obstructions in the field, it does not maintain a proper seed channel under various soil conditions as neither of these two pressures is continuously adjusted to maintain down pressure or penetration by the seed channel opener.

U.S. Pat. No. 4,413,685 to Gremelspacher et al., issued Nov. 8, 1983, discloses a planting implement having a device which enables the monitoring and remote adjustment of the planting depths of planting units connected to the planter. The device includes an adjustment bar mounted to the main frame of the planter. The position of the adjustment bar determines the vertical position of the depth control wheels relative to the planter frame. By sensing the position of the adjustment bar, the device determines the relative position of the depth control wheel to the frame and the operator can make the adjustment such that the depth control wheel is in contact with the ground. One drawback to the Gremelspacher et al. device is the cumbersome use of a computer and monitoring device. Another disadvantage is that Gremelspacher et al. is measuring the relative position of the depth control wheel relative to the frame and does not ensure that the furrow-opening discs are penetrating the surface to the proper depth. In addition, the device does not provide for automatic adjustment to ensure depth control, but relies on the operator.

U.S. Pat. No. 5,562,165 to Janelle et al., issued Oct. 8, 1996, discloses a hydraulic downpressure system for use on non-tillage seeders which enables a constant downward force to be applied on the ground working implements. The system provides a ground working mode which increases the downward pressure when the GWI's encounter an obstacle that pushes them upward, thereby allowing the GWI's to follow the ground contour while maintaining a constant force. However, Janelle et al. does not provide that the channel seeder is penetrating the ground properly. Nor does Janelle et al. appear to automatically adjust the down pressure in response to varying soil conditions.

U.S. Pat. No. 4,913,070 to Morrison, Jr., issued Apr. 3, 1990, discloses a device for controlling the depth of soil penetration of a ground working implement. The device determines the relative position of the depth control wheel to the frame and adjusts down pressure based on that position. In other words, Morrison is examining the position of the depth control wheel in an attempt to control the depth. Morrison provides that when the depth control wheel position rises, down pressure is exhausted, and when the depth control wheel position lowers, down pressure is increased. However, Morrison's system is ineffective for controlling the depth of soil penetration because rather than controlling the down pressure to keep the seed opener penetrated to the desired depth, it is only keeping the seed opener in contact with the ground. Essentially, Morrison is relying on the weight of the opener to maintain depth penetration. However, in a hard area of a field Morrison's discs would raise the depth control wheel and the system would exhaust pressure to the seed opener. In addition, the Morrison system is mechanical and requires manual adjustment based on variances in field conditions.

Despite the attempts of the prior art to develop a planting implement capable of providing a constant depth of soil penetration, a need still exists for a planting implement having a depth control device which can control the depth of a seed channel being cut. Such a planting implement should be capable of automatically adjusting the down pressure load on the seed channel opener when variances in soil conditions are encountered. Such a planting implement also should optimize the planter's efficiency while encountering varying soil conditions.

After planting several thousand acres with a corn planter and a bean planter, the inventors of the present invention carefully observed what was happening to the mechanization of the planter as it encountered different soil conditions. The inventors discovered that the depth control wheel that is located next to each seed channel opener of each planting implement functions as a very good indicator as to what type of soil is being encountered and whether the seed channel is being cut to a proper depth. When harder soil is encountered, the depth control wheel does not contact the ground until the down pressure to the respective seed channel opener is manually increased. When wetter soil is encountered, the depth control wheel accumulates and pushes mud. When softer soil conditions are encountered, the depth control wheel runs too deep. As a result of these observations, it was discovered that in order to control the depth of the seed channel, the depth control wheel should always be in light contact with the ground. Thus, such a planting implement should include a depth control device which measures the load on the depth control wheel.

SUMMARY OF THE INVENTION

Accordingly, it is an object of the present invention to provide a planting implement having a depth control device for measuring the load on the depth control wheel of a planting implement.

It is another object of the present invention to provide a planting implement having a depth control device for measuring the load on the depth control wheel which utilizes a support and adjustment mechanism that is in communication with the depth control wheel and with the seed channel opener.

It is an additional object of the present invention to provide a planting implement having a depth control device for measuring the load on the depth control wheel which will automatically adjust the down pressure to accommodate varying soil conditions.

It also is an object of the present invention to provide a planting implement having a depth control device for measuring the load on the depth control wheel which will ensure that the seed channel is being cut at a consistent depth when the planting implement encounters varying soil conditions.

It is a further object of the present invention to provide a depth control device for measuring the load on the depth control wheel on a variety of planting implements, including corn, soybean, sugar beet, vegetable, potato, or specialty crop planters.

It is another object of the present invention to provide a planting implement having a depth control device which measures the load on the depth control wheel to ensure that the seed channel is being cut a consistent depth when variances in soil conditions are encountered and which can be used in both area-tilling involving the utilization of different tillage practices throughout a field and precision farming involving the optimization of input costs and yields within each square foot of a field.

It is yet another object of the present invention to provide a planting implement, having a depth control device to measure the load on a depth control wheel, the depth control device is in electronic communication with an electronic control unit which is capable of controlling and automatically adjusting the down pressure exerted on the seed channel opener.

It is a further object of the present invention to provide a planting implement having a depth control device in electronic communication with an electronic control unit, wherein the electronic control unit is integrated with the planting implement's down pressure control system.

It is still another object of the present invention to provide a planting implement having a depth control device to measure the load on a depth control wheel which will improve crop yield due to precision seed placement.

It is an additional object of the present invention to provide a planting implement having a depth control device to measure the load on a depth control wheel which will reduce unnecessary equipment wear.

Additional objects, advantages and novel features of the invention will be set forth in part of the description and claims which follow, and in part will become apparent to those skilled in the art upon examination of the following specification or may be learned by practice of the invention.

These and other objects of present invention are accomplished by providing a planting implement which is to be pulled by a vehicle, such as a tractor, having a seed channel opener, a depth control wheel joined to the seed channel opener by a support and adjustment mechanism, a depth control device which measures the load on the depth control wheel and an electronic control unit which is in electronic communication with the depth control device and with the down pressure control and electrical systems of the vehicle. In one embodiment, the depth control device can be in the form of an instrumented arm which continually measures the load on the depth control wheel as the depth control wheel is being moved along the ground surface. Readings of specific load measurements are taken at different points along the planting implement and transmitted to the electronic control unit, where the readings are averaged and sampled every few seconds so as not to create an erratic reading. Based on these readings, the electronic control unit determines whether adjustment of the down pressure is required. If adjustment is required, the electronic control unit automatically adjusts the down pressure exerted on the seed channel opener in order to maintain the proper seed channel depth.

BRIEF DESCRIPTION OF THE DRAWINGS

The present invention will be better understood with reference to the appended drawing sheets, wherein:

FIG. 4 is a schematic view of a Wheatstone bridge.

FIG. 5 is a side perspective view of a first embodiment of the depth control device of the present invention utilizing a Wheatstone bridge having rotated strain gauges.

FIG. 6 is a side perspective view of a second embodiment of the depth control device of the present invention utilizing a beam load cell.

DETAILED DESCRIPTION

Figure 1:
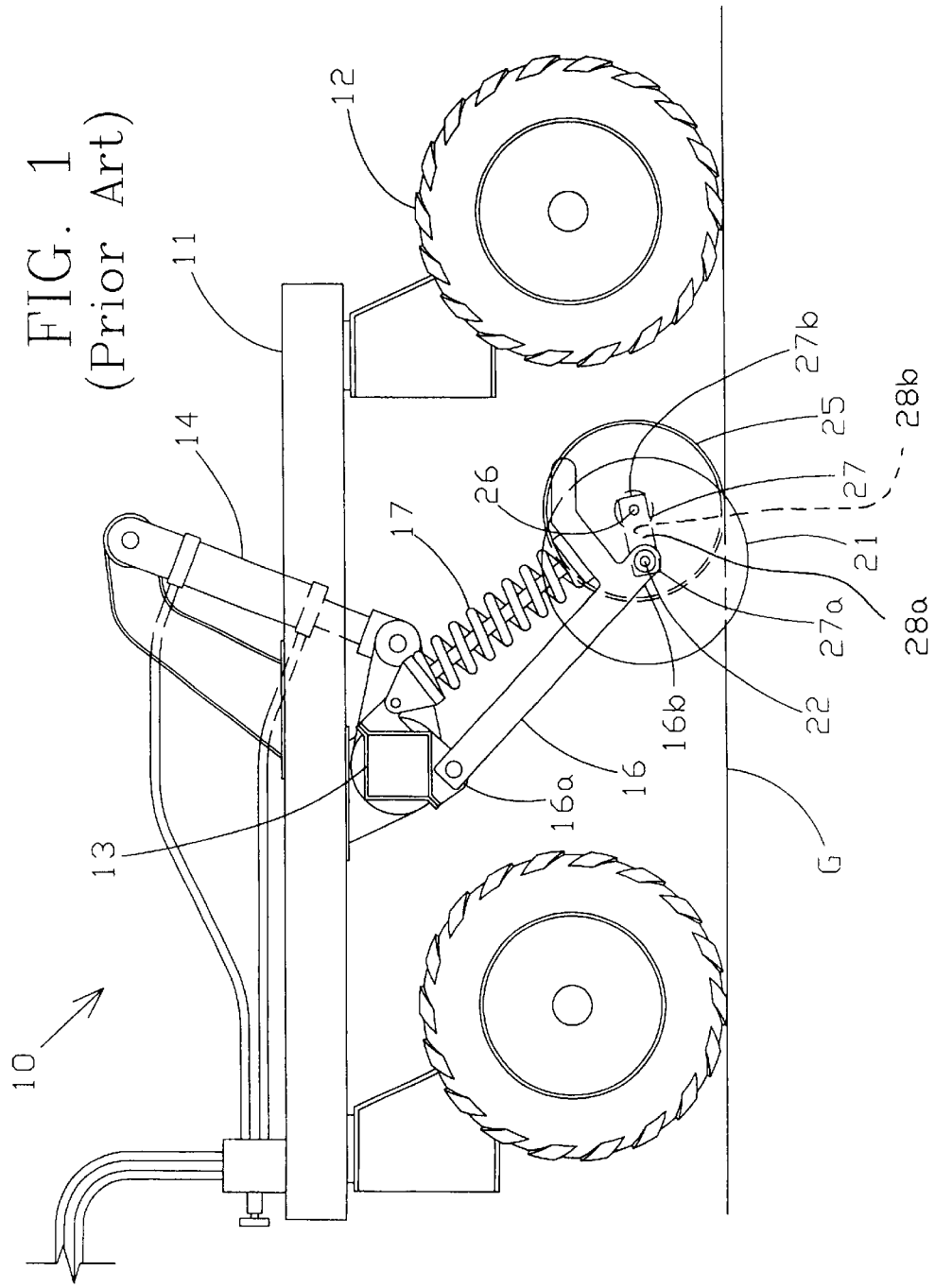
FIG. 1 is a side perspective view of a prior art planting implement.

A simplified schematic of a prior art planting implement is shown in FIG. 1, the planting implement being connected to a tractor (not shown). The planting implement 10 comprises a fixed main frame 11 having tires 12 attached thereto for movement along the ground G. A rockshaft or rock arm 13 is mounted to the frame 11, the rockshaft 13 running the length of the frame 10 perpendicular to the direction of travel and being pivotable about its long axis. At least one hydraulic cylinder 14 is secured between the frame 11 and the rock arm 13 to control the rotation of the rock arm relative to the frame. Hydraulic pressure is supplied to the hydraulic cylinder by the tractor connected to the planting implement 10 by means of a hydraulic valve, also mounted to the frame 11, which supplies the set pressure to the hydraulic cylinder 14. Although a hydraulic cylinder is shown and described, it will be obvious to those skilled in the art that a pneumatic or air cylinder supplying pneumatic or air pressure can be used rather than a hydraulic cylinder. One or more ground working implements (GWI) 16, each having a proximal end 16a and a distal end 16b, is secured to the rock arm 13 and extends perpendicular to the rock arm, downward and backward relative to the direction of travel. A typical example of a ground working implement is a conventional cast arm. It is to be understood that although only one GWI is shown, the planting implement can be provided with a plurality of ground working implements. The number of ground working implements is dependent upon the number of rows being planted; there is one GWI for every row the planter is capable of planting. A spring member 17 is located between the rock arm 13 and the ground working implement 16 to absorb shock as the planting implement travels over uneven ground or encounters an obstruction.

Affixed to the distal end 16b of the ground working implement is a seed channel opener 21 in the form of a rotatable disc (sometimes referred to hereinafter as disc 21). The center axis 22 of the disc 21 is angularly offset from perpendicular to the direction of travel such that it cuts a channel for the seed to be placed. The relative center location of the disc 21 to the ground is critical to ensure proper seeding depth. A depth control wheel 25 is mounted adjacent to disc 21 to help maintain a proper depth of the disc. The disc 21 cuts a seed channel into the ground while the depth control wheel lightly contacts and rolls over the ground. The relative center axis location between the disc and the depth control wheel is fixed by a support and adjustment mechanism 27 having a first end 27a and a second end 27b. The support and adjustment mechanism, which in this exemplary prior art embodiment is an eccentric arm, is rectangular in cross section. The support and adjustment mechanism 27 is rotatably fixed to the center axis 22 of the disc 21 at first end 27a and is rotatably fixed to the center axis 26 of the depth control wheel 25 at second end 27b. This arrangement allows the support and adjustment mechanism 27 to be rotated and fixed through a range of positions, thereby setting the distance between the bottom most surface of the depth control wheel and the bottom most edge of the disc.

Figure 2:
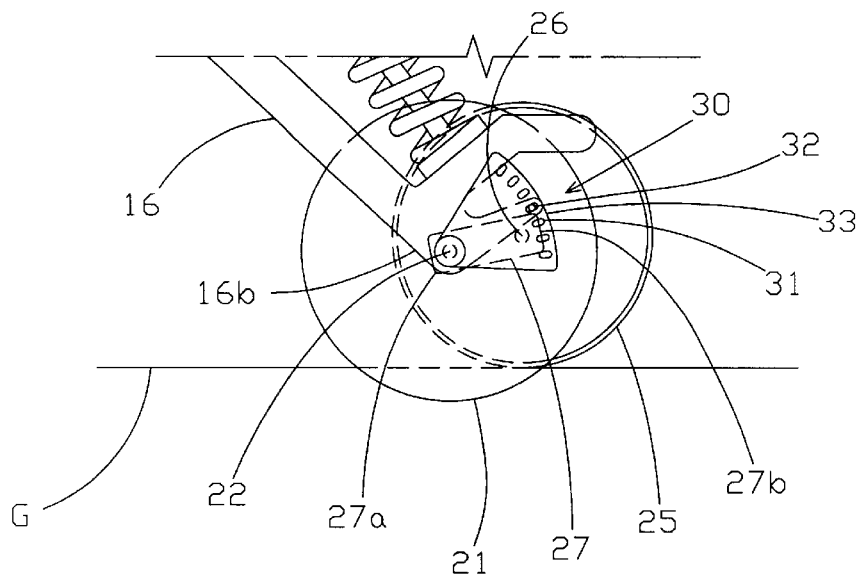
FIG. 2 is a side perspective view of the adjustment mechanism of a prior art planting implement.

More particularly and referring to FIG. 2, the position of the depth control wheel 25 is set relative to the position of the disc 21 by rotating the depth control wheel and the support and adjustment mechanism 27 around the centerline of the disc. Attached to the support and adjustment mechanism, through the axis of the disc 21 is an adjustment mechanism 30, such as a plate 33 having a number of slots 31. A pin 32 attached to the cast arm 16 is configured to engage one of the slots 31. When the desired position between the disc 21 and the depth control wheel 25 is reached, the pin 32 is inserted in the closest slot, thereby fixing the relative position. In this manner, the selected position of the support and adjustment mechanism dictates the desired depth of the seed channel being cut. Once the selected position is set, when the depth control wheel is above the ground, the disc is not cutting a deep enough channel, and when the depth control wheel is below the ground surface, the disc is cutting a channel that is too deep.

In the general operation of the conventional planting implement described above, the relative depth at which the seed channel should be cut is determined and the relative positions of the disc 21 and depth control wheel 25 are established by rotating the depth control wheel about the disc using the support and adjustment mechanism 27 until the desired depth is reached, then securing the support and adjustment mechanism and depth control wheel. Hydraulic pressure is applied to the hydraulic cylinder 14 by manual adjustment of the hydraulic valve until the ideal hydraulic pressure is obtained, thereby allowing the disc to penetrate the ground at the selected depth and maintain the depth control wheel in light contact with the ground surface. The planting implement is now set for cutting the seed channel (s). In operation, the frame 11, supported by its tires 12, rolls over the ground surface G and the ideal hydraulic pressure being applied to the hydraulic cylinder(s) rotates the rock arm and cast arm(s) until the disc is buried to the desired depth and the depth control wheel light contacts and rolls along the ground surface. In this manner, the buried disc cuts a seed channel in the ground and seed is placed in the channel.

When the condition of the ground is uniform, the depth of the seed channel being cut will remain fairly constant. However, soil conditions are rarely uniform in no-till farming. Thus, when the conventional planting implement encounters a "harder" soil condition, the hydraulic pressure being applied is insufficient and the depth of the channel being cut will be less than desired. Conversely, when the planting implement encounters a "softer" soil condition, the hydraulic pressure being applied is too great, resulting in a seed channel which is too deep. In order to compensate for the non-uniform field conditions, the hydraulic pressure being applied must be manually adjusted in order to maintain proper seed planting depth.

Figure 3:
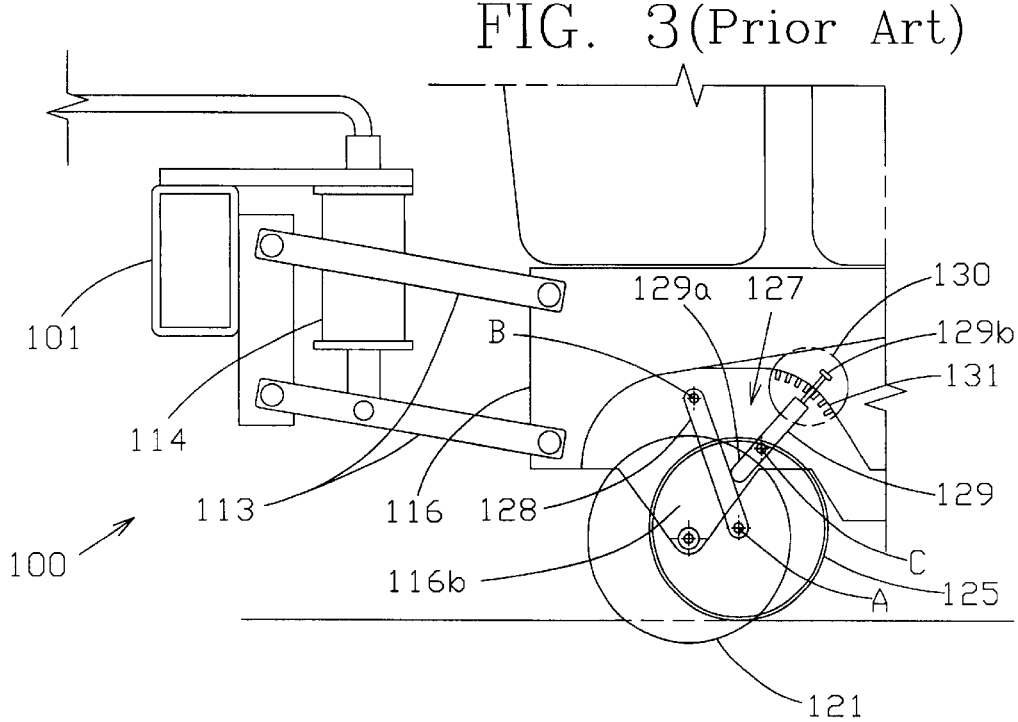
FIG. 3 is a schematic view of a second prior art planting implement.

Another prior art planting implement is shown in FIG. 3, the planting implement being connected to a tractor (not shown). The planting implement 100 comprises a fixed frame 101 having tires (not shown) attached thereto for movement along the ground, a ground working implement 116 joined to the frame 101 by parallel links 113 and an air cylinder 114 secured between the frame and parallel links. A seed channel opener 121 and depth control wheel 125 are mounted to the distal end 116b of the ground working implement 116. The relative center axis location between the disc and depth control wheel is fixed by a support and adjustment mechanism 127 having a first link 128 and a second link 129. The air cylinder 114 provides down pressure by pushing the ground working implement 116 towards the ground relative to the frame 101. When the GWI 116 engages the ground, the seed channel opener 121 cuts a seed channel at a depth dictated by the setting of the depth control wheel 125. When the ground working implement is suspended above the ground, the depth control wheel rotates clockwise supported at its axis at A and around B. As the depth control wheel makes contact with the ground, it rotates counter clockwise until the first link 128 makes contact with the contact end 129a of the second link 129. The position of the second link 129 is established by rotating the second link 129 about C and setting the pin end 129b of the second link within one of the slots 131 of the adjustment mechanism 130.

The present invention provides a depth control device to be used with the conventional planting implement described above and shown in FIGS. 1, 2 and 3 which continuously monitors the load on the depth control wheel 25/125. The depth control device is in electronic communication with an electronic control unit that automatically adjusts the hydraulic pressure being supplied to the hydraulic cylinder 14 (or air pressure being supplied by air cylinder 114), thereby adjusting the down pressure exerted on the seed channel opener to maintain the selected depth of the seed channel being cut without stopping or interrupting progress and without requiring manual adjustment by the operator of the planting implement.

Determining the location and operation of the depth control wheel 25/125 is essential in measuring the load on the depth control wheel. As described above, the depth control wheel 25/125 is mounted eccentrically to the adjacent seed channel opener 21/121 by the support and adjustment mechanism 27/127. Since the support and adjustment mechanism fixedly locates the depth control wheel and as the load on the wheel is supported by the support and adjustment mechanism 27, the support and adjustment mechanism provides an advantageous location to measure the load on the wheel. For example, referring to FIGS. 1 and 2, the load on the depth control wheel is translated to the wheel axis 26 which is located on second end 27b of the support and adjustment mechanism 27. The support and adjustment mechanism is generally parallel to the ground G (depending on the depth setting) such that the load on the support and adjustment mechanism is generally perpendicular to the support and adjustment mechanism. The first end 27a of the support and adjustment mechanism is fixed to the center axis 22 of the seed channel opener 21 and the end of the ground working implement 16. Because of this arrangement, the support and adjustment mechanism is subjected to bending. Therefore, the load on the support and adjustment mechanism can be measured by determining the bending stress thereon. The bending load can be defined by the following equation:

$$F_{bending} = F_{wheel} * (\cos\theta)$$

wherein θ is the angle between the ground G and the support and adjustment mechanism 27. The bending load then can be used to compute a bending stress "σ" in the arm by using the following equation:

$$\sigma = \frac{F_{bending}}{Z}(l-x)$$

wherein Z is the section modulus, (thickness * (height)$^3$)/12, l is the length of the arm, and x is the distance from the end of the arm.

In a first embodiment of the present invention, the depth control device 40 is in the form of a plurality of strain gauges arranged as a wheatstone bridge as shown in FIG. 4.

More specifically, strain gauges can be used to determine the bending stress σ. As is well known in the prior art, a strain gauge is a fine trace of wire which functions as a resistor. In order to measure the bending stress σ, one or more strain gauges are attached to a surface of an article. When the surface of the article moves, for example due to bending, compression, or tension, the resistance of the strain gauge will change. The change in resistance can be measured and correlated to stress in the article. A common circuit used to measure a change in strain gauge resistance is a wheatstone bridge 42 as shown in FIG. 4. Each strain gauge 41 is a resistor in the Wheatstone Bridge circuit. A fixed voltage is applied to the corners of the bridge and an output voltage is monitored on the opposite corners.

In order to measure bending stress a in the support and adjustment mechanism 27, the depth control device 40 comprises four strain gauges 41 arranged as a wheatstone bridge circuit. More particularly, a pair (two) of strain gauges are applied to first side 28*a* of the support and adjustment mechanism and a pair (two) of strain gauges are applied to the second side 28*b* of the support and adjustment mechanism, each strain gauge functioning as one leg of a wheatstone bridge. To measure bending, it is advantageous to rotate each of the pair of strain gauges 90° relative to each other and rotate the pair of strain gauges 45° from parallel with respect to the respective side, as shown in FIG. 5. The resistance of the strain gauges will change as the support and adjustment mechanism 27 is bent. The change in resistance can be measured by monitoring the output voltage from depth control device 40 (in the form of a wheatstone bridge circuit) as described above. In this manner, the depth control device 40 monitors and measures the load on the depth control wheel 25.

Figure 7:
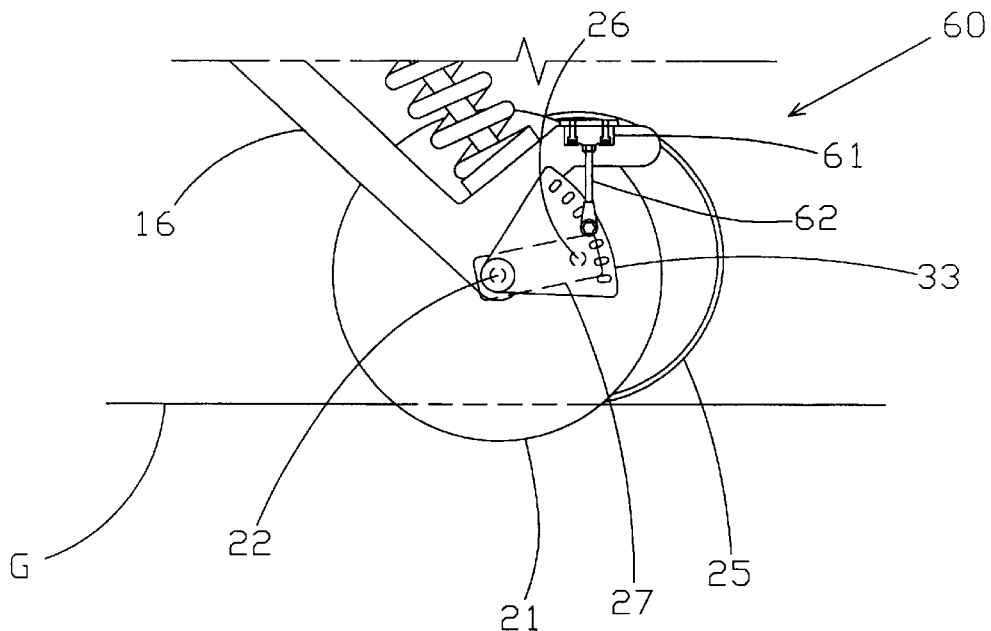
FIG. 7 is a side perspective view of a third embodiment of the depth control device of the present invention utilizing a tension/compression load cell.

In a second embodiment of the present invention, the depth control device 50 is in the form of a beam load cell 51 as shown in FIG. 6 which is joined and engages plate 33 of the depth adjustment mechanism 30 by means of an adjustable arm 52, such as a threaded rod and clevis/bolt arrangement. A conventional beam load cell consists of a strain gauge beam and is prepackaged to be used in place of a link of similar size. In a third embodiment of the present invention, the depth control device 60 is in the form of a tension/compression load cell 61, as shown in FIG. 7. As in the second embodiment, the depth control device 60 is mounted to the ground working implement 16 and it is joined to and engages plate 33 of the adjustment mechanism 30 by means of an adjustable arm 62. In operation, the load applied on the depth control wheel 25 causes the support and adjustment mechanism 27 and the plated 33 of the depth adjusting mechanism 30 to rotate about the center axis 22 of the disc 21, forcing the adjustable arm 52/62 into the load cell 51/61. The load cell transmits a output voltage to the electronic control unit 100 based on the magnitude of the load.

Figure 8:
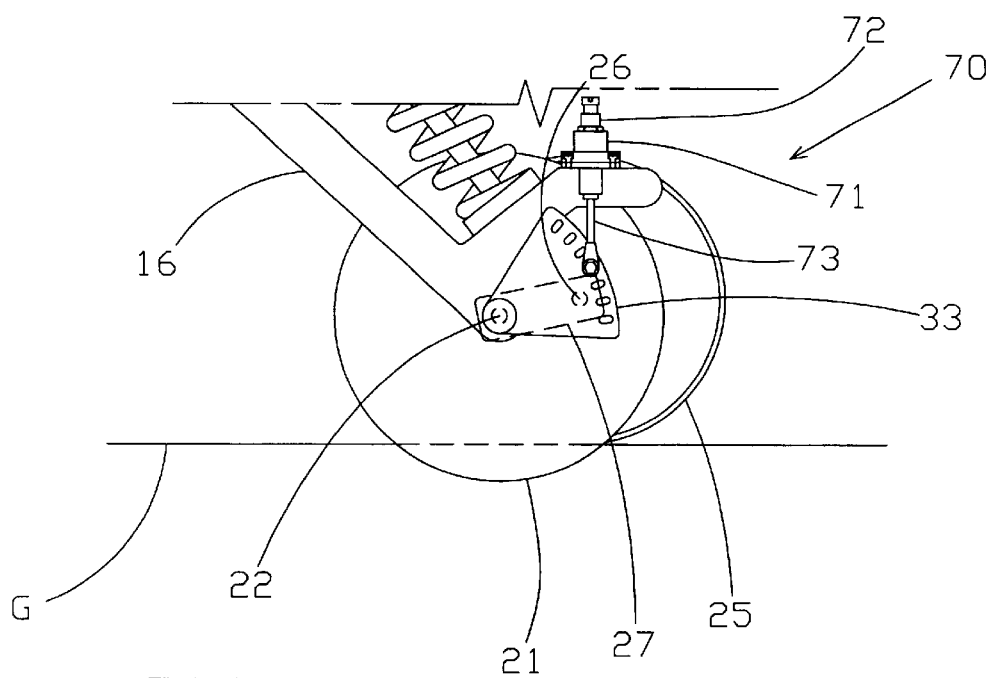
FIG. 8 is a side perspective view of a fourth embodiment of the depth control device of the present invention utilizing a static hydraulic cylinder.

In a fourth embodiment of the present invention, the depth control device 70 utilizes static hydraulic pressure to measure the load on the depth control wheel. Referring to FIG. 8, the depth control device 70 is in the form of a static hydraulic cylinder 71 in communication with a pressure sensor 72. The static hydraulic cylinder 71 is mounted to the ground working implement 16 and it is joined to and engages plate 33 of the adjustment mechanism 30 by means of an adjustable arm 73, such as a threaded rod and clevis/bolt arrangement. When load is placed on the depth control wheel, the load is through the center axis 26 of the depth control wheel, transmitted through the support and adjustment mechanism 27 and through plate 33 of the depth adjusting mechanism 30 and to the adjustable arm 73. The adjustable arm 73 transmits the load to the static hydraulic cylinder 71. As the load on the depth control wheel is increased, the static hydraulic pressure in the cylinder will increase. The pressure transducer 72 is used to measure the change in hydraulic pressure and output the data to the electronic control unit 100.

Figure 9:
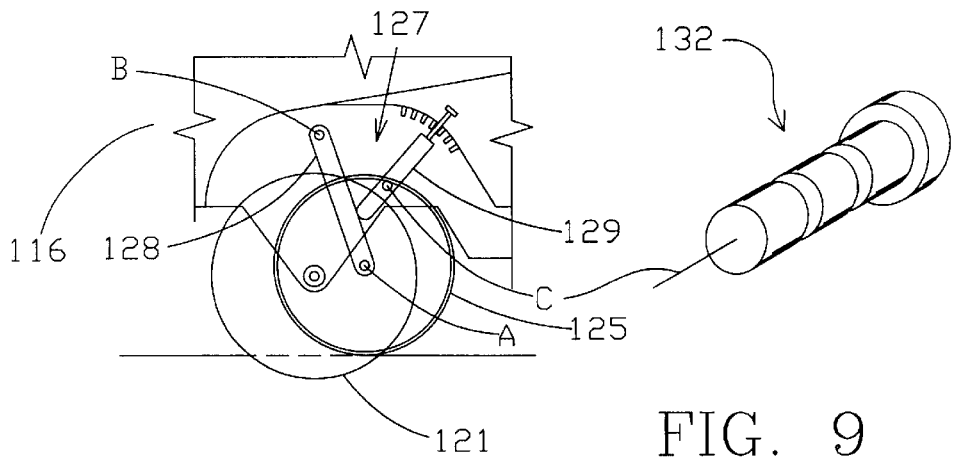
FIG. 9 is a side perspective view of a fifth embodiment of the depth control device of the present invention utilizing a shear load cell.

In a fifth embodiment of the present invention, and referring to FIG. 3 and FIG. 9, the depth control device is in the form of a shear load cell 132. The shear load cell replaces the pin at axis C of the second link 129. The second link 129 is rotatably fixed at C by the shear load cell. In operation, the load applied on the depth control wheel causes the first link 128 of the support and adjustment mechansim 127 to rotate about its axis B and into the second link 129 at the contact end 129*a*. The load is transmitted through the second link 129, and into the shear load cell. The shear load cell transmits an output voltage to the electronic control unit 100 based on the magnitude of the load.

In each of these five embodiments, the depth control device of the present invention utilizes the support and adjustment mechanism to produce an output voltage based on load on the depth control wheel. This output voltage is transmitted electronically to an electronic control unit 100. The electronic control unit 100 is a closed loop system attached to the frame 11 of the planting implement 10 and connected to the electrical and hydraulic or pneumatic systems of the vehicle (e.g. tractor) pulling the planting implement. The function of the electronic control unit is to monitor the output from the depth control device and transmit a control signal.

Figure 10:
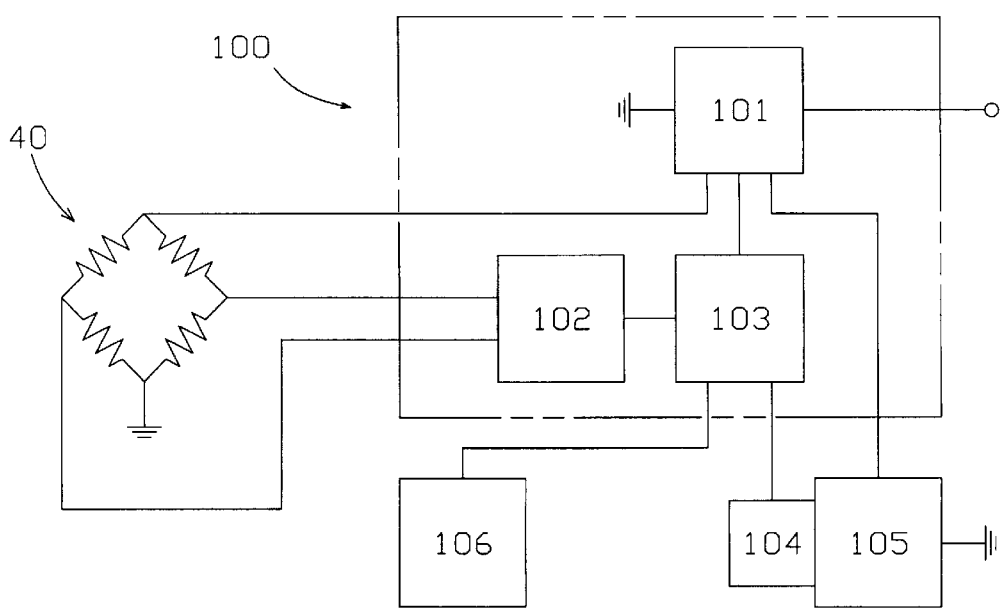
FIG. 10 is a schematic of the electronic control system.

Referring now to FIG. 10, the electronic control unit 100 comprises a voltage regulator 101 which is supplied by the 12 volt electrical system of the vehicle, e.g. tractor, used to pull the planting implement. The voltage regulator is configured to output a stable, conditioned 5 volt power supply and a 12 volt power supply. The 5 volt supply is sent to the depth control device . An amplifier/signal conditioner/filter 102 monitors the output from the depth control device. When depth control device includes a wheatstone bridge, the amplifier/signal conditioner/filter 102 is necessary to monitor the voltage output at each corner of the wheatstone bridge and monitor the relative difference. If both legs of the bridge (two resisters on each leg) are equal and no stress is present, the output voltage at the corners of the bridge will be one half the input voltage each. The relative difference between the two is zero. When stress is present, the resistance of each strain gauge changes relative to the others, the legs of the bridge become unequal, and the output voltage difference will be non-zero. The output voltage is commonly in the millivolt range requiring the amplifier/signal conditioner/filter 102 to produce a usable signal to transmit to a micro-controller 103. The amplifier/signal conditioner/filter 102 amplifies the output voltage from millivolts to a 0 to 5 volt signal. This signal is sent to the micro-controller 103.

The micro-controller 103 functions as the processor of the electronic control unit 100, operating the control software and linking the control algorithm with any user inputs 106 (such as initial set down pressure). The micro-controller 103 also processes the information from external and user inputs, and calculates the proper output. The micro-controller 103 operates by applying the processed output from the depth control device to the input of the analog to digital (A/D) converter of the micro-controller, where the strain gauge signal is digitized. Based upon this signal, and any user inputs, an output control value is calculated by the micro-controller. This output control value can be calculated by any number of algorithms, including for example, "Stepwise", "PID" (proportional, integral, differential) and "Fuzzy tuned PID". Stepwise is a step-wise/error based control which provides a time averaged, incremental output to a valve controller 104. Thus, "Stepwise" constantly reads output from the depth control device and continuously averages it. At equal intervals the micro-controller sends an output based on the average input it has received over the interval. The output is scaled based on the difference between what was measured and what is desired. PID control is a very common control strategy. It can eliminate overshoot and undershoot and provide a fast smooth response. The three parameters; proportional, integral, and differential need to be set or "tuned" to the system. PID control provides continuous output to valve controller 104. The fuzzy tuned PID can automatically and continuously adjust the three parameters based on a set of predetermined rules. As a result, fuzzy tuned PID provides continuous, self-correcting output to the valve controller 104.

The sensed load, or sensed output, as measured by the depth control device is transmitted to the electronic control unit, specifically the micro-controller 103. The micro-controller processes the information and compares the sensed output with external or user inputs 106, calculates the output based on the control algorithm, and sends the output value to the valve controller 104. User inputs include operating parameters such as the initial down pressure and ranges of output to the mechanical devices connected to the electronic control unit and specifically to the hydraulic valve (or pneumatic valve) used to adjust the hydraulic or pneumatic pressure of the system. The valve controller 104 drives a regulating valve 105. The regulating valve 105 changes pressure to the actuation means altering the down pressure of the ground working implement. Thus, the manually adjusted pressure valve is replaced with a regulating valve 105 which is controlled by the electronic control unit 100. The regulating valve 105 can be controlled by either variable current or variable voltage. Both voltage and current can be transmitted by the electronic control unit. A suitable example of a regulating valve is the Hydraforce TS10-36, a proportional hydraulic valve manufactured by HydroForce, Inc. of Lincolnshire, Ill., and having a proportional valve controller/amplifier (PVCA) which is powered by the 12-volt supply of the tractor. The output from the micro-controller (0.0 to 5.0v) is input to the PVCA. The PCVA changes its output to the solenoid coil of the hydraulic valve based on the control input entered into the micro-controller.

Figure 11:
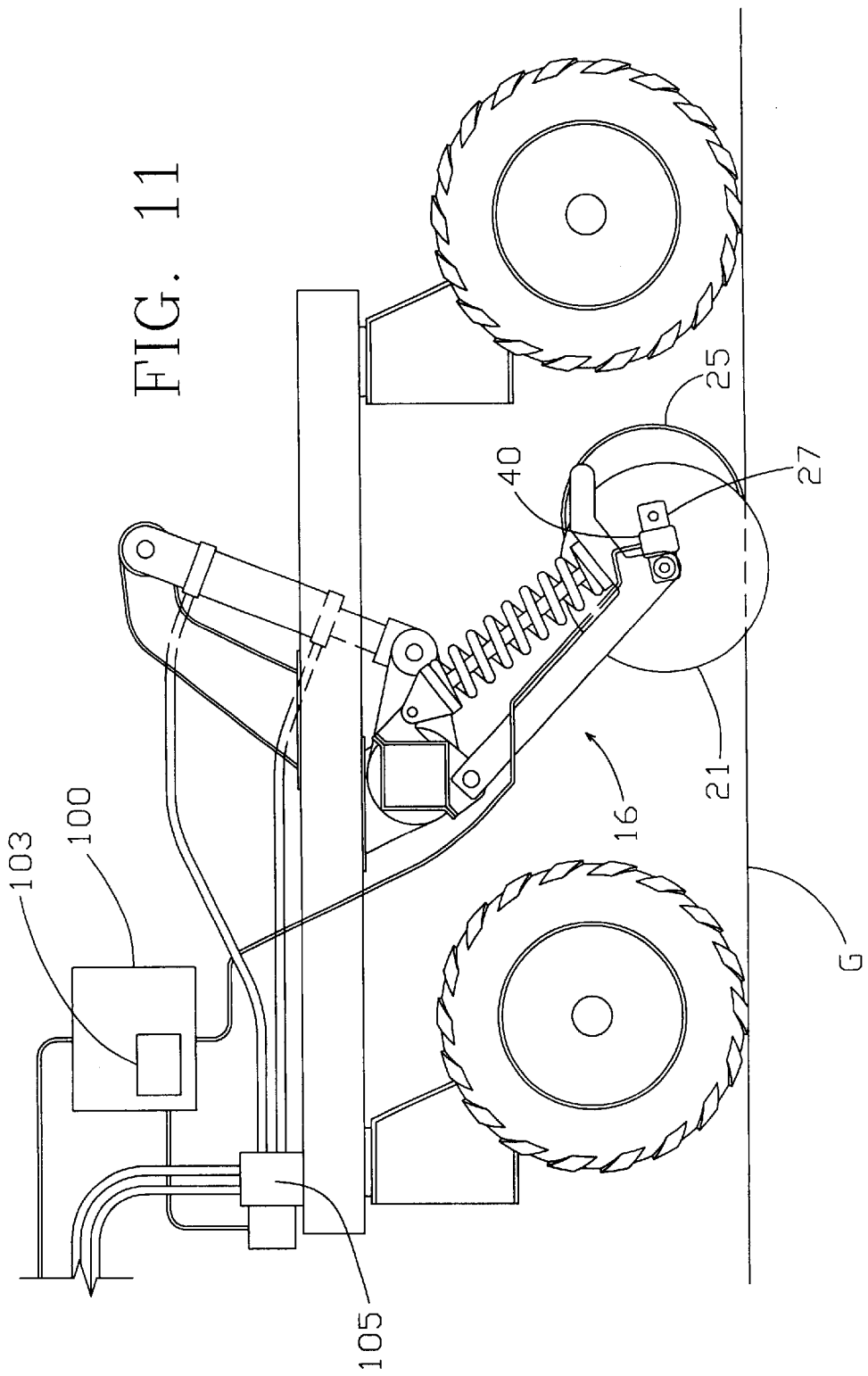
FIG. 11 is a side perspective view of the of a planting implement having the electronic control system and a support and adjustment mechanism of the present invention.

FIG. 11 is a schematic illustrating a planting implement having depth control device 40 in electronic communication with the electronic control unit 100. More particularly, the planting implement comprises one or more ground working implements 16, each GWI having a seed channel opener 21 joined to a depth control wheel 25 by support and adjustment mechanism 27, the support and adjustment mechanism in communication with the depth control device 40 to measure the load on the depth control wheel. The sensed output from the depth control device 40 is transmitted electronically to the electronic control unit 100 which analyzes the sent output. When a change in the load on the depth control wheel is determined, the electronic control unit transmits an electronic signal to the regulating valve 105 through the microcontroller 103 in order to adjust the down pressure being exerted on the seed channel opener 21. In this manner, the depth control device of the present invention continuously measures the load on the depth control wheel and transmits the sensed output to the electronic control unit which continuously monitors the sensed output and automatically adjusts the down pressure exerted on the seed channel opener when a change in the load on the depth control device is determined.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A planting implement which is connectable to a vehicle for towing comprising:
   (a) a frame having tires attached thereto for movement along a ground surface;
   (b) a ground working implement having a proximal end connected to said frame and a distal end, said ground working implement further comprising:
      (i) a seed channel opener having a center axis and affixed to said distal end of said ground working implement, said seed channel opener adapted to be driven into said ground surface to form a seed channel to a first depth;
      (ii) a depth control wheel having a center axis, said depth control wheel adapted to be in light contact with said ground surface;
      (iii) a support and adjustment mechanism secured between said seed channel opener and said depth control wheel, said support and adjustment mechanism adapted to support said depth control wheel at a relative position to said seed channel opener, and
      (iv) a depth adjusting mechanism connected to said support and adjustment mechanism;
   (c) an actuating device secured between said frame and said ground working implement, said actuating device adapted to exert and adjust a down pressure on said seed channel opener;
   (d) a depth control device adapted to measure the load on said depth control wheel in order to determine a sensed load on said depth control wheel and electronically transmit a sensed load output;
   (i) an electronic control unit capable of receiving, monitoring and analyzing the sensed load output transmitted by said depth control device, and
   (j) a regulating valve in communication with said electronic control unit and in communication with said actuating device,
   wherein, when said electronic control unit determines a change in the sensed load output received by said depth control device, said electronic control unit transmits a signal to said regulating valve which causes said actuating device to adjust the down pressure on said seed channel opener, thereby maintaining said seed channel opener at said first depth.

2. The planting implement in accordance with claim 1, wherein said depth control device for measuring the load on the depth control wheel is a wheatstone bridge circuit arrangement which is connected to said support and adjustment mechanism, said wheatstone bridge circuit arrangement comprising a first pair of strain gauges applied to a first surface of said support and adjustment mechanism and a second pair of strain gauges applied to a second surface of said support and adjustment mechanism, each of said first and second pair of strain gauges having two strain gauges.

3. The planting implement in accordance with claim 2, wherein the two strain gauges in each of said first and second pair of strain gauges are disposed at 90° relative to each other and said each of said first and second pair of strain gauges is disposed at 45° from parallel relative to each respective side.

4. The planting implement in accordance with claim 1, wherein the sensed load output is measured by determining the output voltage produced by said depth control device having a wheatstone bridge circuit arrangement.

5. The planting implement in accordance with claim 1, wherein said depth control device for measuring the load on the depth control wheel is in the form of a beam load cell which is connected to said depth adjusting mechanism by means of an adjustable arm.

6. The planting implement in accordance with claim 1, wherein said depth control device for measuring the load on the depth control wheel is in the form of a tension/compression load cell which is connected to said depth adjusting mechanism by means of an adjustable arm.

7. The planting implement in accordance with claim 1, wherein said depth control device for measuring the load on the depth control wheel is in the form of a static hydraulic cylinder in communication with a pressure sensor and connected to said depth adjusting mechanism by means of an adjustable arm.

8. The planting implement in accordance with claim 1, wherein said depth control device for measuring the load on the depth control wheel is in the form of a shear load cell which is connected to said support and adjustment mechanism.

9. The planting implement in accordance with claim 1, wherein said electronic control unit comprises:

(a) a voltage regulator;

(b) an amplifier/signal conditioner/filter, and (c) a micro-controller.

10. The planting implement in accordance with claim 9, wherein said micro-controller processes the sensed load output transmitted by said depth control device and calculates an output control value from said sensed load output and transmits said output control value to said regulating valve.

11. The planting implement in accordance with claim 10, wherein said output control value is calculated by a control algorithm selected from the group consisting of Stepwise logic, PID logic and fuzzy-tuned PID logic.

12. The planting implement in accordance with claim 1, wherein said actuating device is in the form of a hydraulic cylinder.

13. The planting implement in accordance with claim 1, wherein said actuating device is in the form of a pneumatic cylinder.

14. A method for automatically adjusting the down pressure exerted by an actuating device on a seed channel opener of a planting implement, said planting implement including a seed channel opener adapted to be driven into a ground surface to form a seed channel at a first depth, a depth control wheel, a support and adjustment mechanism having a first end connected to said seed channel opener and a second end connected to said depth control wheel, and a depth adjusting mechanism connected to said support and adjustment mechanism, said method comprising:

(a) connecting a depth control device to said support and adjustment mechanism, said depth control device adapted to measure the load on said depth control wheel in order to determine a sensed load on said depth control wheel and electronically transmit a sensed load output;

(b) providing an electronic control unit mounted to said planting implement, said electronic control unit adapted to receive, monitor and analyze the sensed load output transmitted by said depth control device, and (c) providing a regulating control valve in communication with said electronic control unit and in communication with said actuating device, wherein, when said electronic control unit determines a change in the sensed load output received by said depth control device, said electronic control unit transmits a signal to said regulating control valve which causes said actuating device to adjust the down pressure exerted on said seed channel opener, thereby maintaining said seed channel opener at said first depth.

15. The method in accordance with claim 14, wherein said depth control device is in the form of a wheatstone bridge circuit arrangement which is connected to said support and adjustment mechanism.

16. The method in accordance with claim 14, wherein said depth control device for measuring the load on the depth control wheel is in the form of a beam load cell which is connected to said depth adjusting mechanism by means of an adjustable arm.

17. The method in accordance with claim 14, wherein said depth control device for measuring the load on the depth control wheel is in the form of a tension/compression load cell which is connected to said depth adjusting mechanism by means of an adjustable arm.

18. The method in accordance with claim 14, wherein said depth control device for measuring the load on the depth control wheel is in the form of a static hydraulic cylinder in communication with a pressure sensor and connected to said depth adjusting mechanism by means of an adjustable arm.

19. The planting implement in accordance with claim 14, wherein said depth control device for measuring the load on the depth control wheel is in the form of a shear load cell which is connected to said support and adjustment mechanism.

20. The planting implement in accordance with claim 14, wherein said electronic control unit comprises:

(a) a voltage regulator;

(b) an amplifier/signal conditioner/filter, and (c) a micro-controller.

21. The planting implement in accordance with claim 20, wherein said micro-controller processes the sensed load output transmitted by said depth control device and calculates an output control value from said sensed load output and transmits said output control value to said regulating control valve.

22. The method in accordance with claim 14, wherein said actuating device is in the form of a hydraulic cylinder.

23. The method in accordance with claim 14, wherein said actuating device is in the form of a pneumatic cylinder.

* * * * *